Sept. 21, 1971 H. STOLLENWERK 3,606,619
APPARATUS FOR ACCOMMODATING A STRETCHER
Filed June 27, 1969 8 Sheets-Sheet 1

INVENTOR
HANS STOLLENWERK
BY
Lowry, Rinehart & Markus

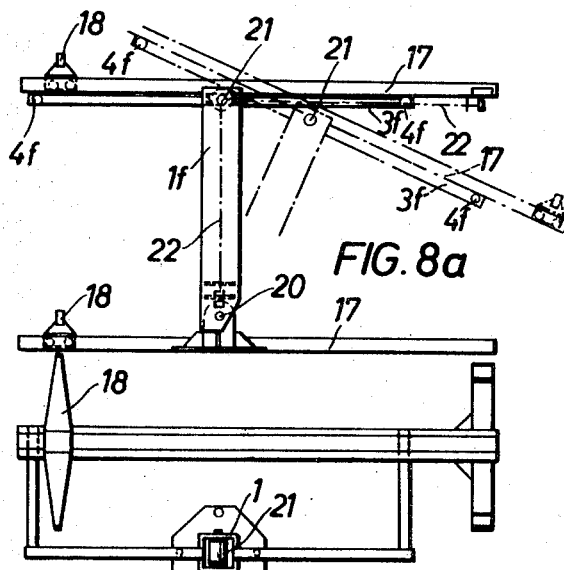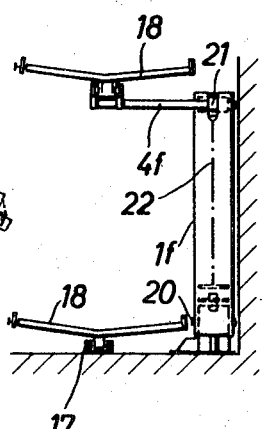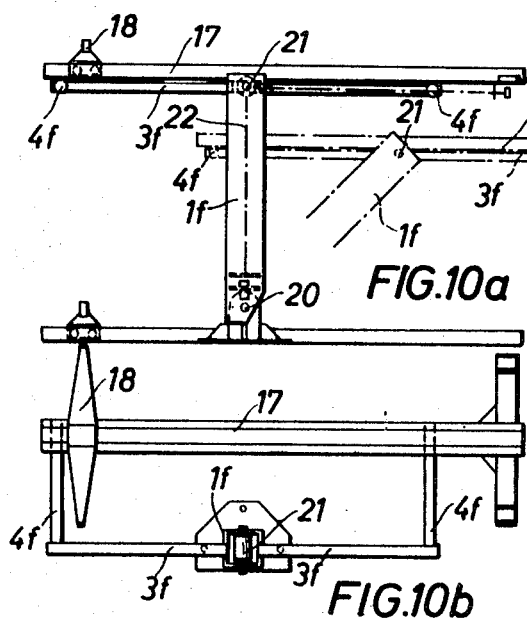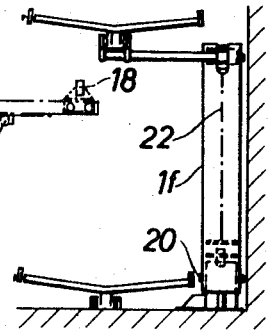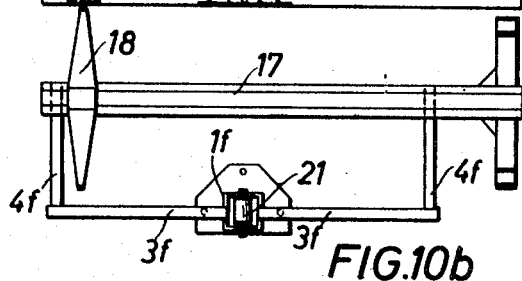

United States Patent Office
3,606,619
Patented Sept. 21, 1971

3,606,619
APPARATUS FOR ACCOMMODATING
A STRETCHER
Hans Stollenwerk, Dellbrucker Haupstr. 197/201,
Cologne-Deilbruck, Germany
Filed June 27, 1969, Ser. No. 837,063
Claims priority, application Germany, June 29, 1968,
P 17 66 664.7
Int. Cl. A47c 17/40; A61g 7/10
U.S. Cl. 5—9                                13 Claims

ABSTRACT OF THE DISCLOSURE

This disclosure provides an apparatus for supporting at least one stretcher in a substantially horizontal position within a vehicle enclosure. The apparatus is especially useful when mounted within an ambulance. A single columnar member is mounted in a substantially vertical position within the vehicle enclosure. A horizontal support means extends in substantially opposite directions from the columnar member. At least two cantilever arms are connected to the horizontal support means. The cantilever arms are laterally displaced with respect to each other and have free ends in a projecting position on which a stretcher is suspended above the bottom of the vehicle enclosure. Various means for folding the apparatus into a storage position are also disclosed.

BACKGROUND OF THE INVENTION

Assemblies having two cantilever arms for accommodating a stretcher in a suspended horizontal position above the floor of a vehicle enclosure such as an ambulance are known in the prior art. These prior art assemblies, however, include two supporting column members which are fixedly attached to the floor of the enclosure. Each of the prior art columnar members supports a respective cantilever arm.

There are several basic disadvantages of this known prior art apparatus. The heavy columnar members provide additional loading on the ambulance. In addition, there are obvious costs incurred in the production of the prior art apparatus because of the material being used in its construction and the manner in which it must be mounted within the vehicle enclosure. Any such assembly receives short shocks upon any oscillatory movement of the ambulance vehicle in which it is mounted. These short shocks are transmitted to the stretcher or stretchers which are supported on the pairs of cantilever arms and thereby jolt the patient lying thereon. This type of jolt to the persons lying on the stretchers has an obvious deleterious effect on the patient's state of being. In addition, the patient may very well have the impression that the stretcher on which he is lying is slipping off the cantilever arms.

Prior art assemblies have included leaf springs which have been arranged below the stretcher for damping the shocks as described hereinabove. The strength of these springs which are used on the prior art assemblies is limited because the only load on the springs is that which is caused by the weight of the person lying on the stretcher. Therefore, under these circumstances, it has been found that any upwardly directed shocks resulting from oscillatory movement of the ambulance vehicle have been increased and the patient has continued to receive shocks which have not been absorbed by the spring arrangement of the prior art. The stronger the springs have been made, the greater have been the shocks exerted on the patient lying on the stretcher.

PURPOSE OF THE INVENTION

The primary object of this invention is to provide an apparatus for accommodating a stretcher in a vehicle enclosure. The apparatus has a very simple construction and may be mounted very easily in any type of ambulance vehicle.

Another object of this invention is to provide an apparatus which will not transmit shaking movements from the ambulance vehicle to the stretcher which is occupied by a patient.

A still further object of this invention is to provide a pair of cantilever arms that are supported by only one supporting column that is mounted in a substantially vertical position.

Another object of this invention is to provide an assembly for accommodating a stretcher which provides a saving in space and weight with respect to assemblies of this type known in the prior art.

A still further object of this invention is to provide an apparatus for supporting at least one stretcher in a substantially horizontal position within an ambulance vehicle which overcomes all of the disadvantages of any of the assemblies known heretofore in the prior art.

SUMMARY OF THE INVENTION

Each pair of cantilever arms which suspends at least one stretcher above the ambulance floor is mounted on a horizontal support means. This horizontal support means includes at least one beam section which extends in substantially opposite directions from a single vertically extending columnar member. The beam section may be supported in substantially the center thereof by the single columnaar member. Any shock wavelengths caused by oscillatory movement of the ambulance vehicle are increased by the assembly constructed in accordance with this invention. The wavelengths are increased to such an extent through the use of this assembly that they are almost imperceptible by the time they reach the stretcher supported thereon. The single columnar member may provide support to as many pairs of cantilever arms as desired.

A specific embodiment of an assembly made in accordance with this invention includes a horizontal support means that includes two horizontal beam sections. These beam sections may be pivotally mounted so that they rotate upwardly or downwardly with respect to the single columnar member. Another feature of this specific embodiment provides cantilever arms which are pivotally mounted with respect to the beam sections. This specific embodiment may be folded into a very compact assembly for storage.

Another feature of this invention provides an assembly that may be attached to the stretcher support apparatus which provides a seat for persons within the vehicle enclosure.

A further feature of this invention provides means for resiliently supporting each beam section that is mounted on the vertical columnar member. A very strong spring structure may be used to reliably accept any shocks occurring during the travel of the ambulance vehicle. The use of the lever structure in combination with the strong spring increases the propensity for the assembly to absorb any such shocks which might occur.

A still further embodiment of this invention includes a beam section that has a telescoping portion. The assembly having this telescoping portion includes bearing members located therein to provide movement between the members of the telescoping beam portions. Any force occurring during braking or starting of the ambulance vehicle will not transmit such shock to the stretcher using this feature of this invention. Any counter oscillations are absorbed due to the movement of the telescoping beam portions with respect to each other when the stretcher is supported thereon.

In a still further embodiment of this invention, means are provided to facilitate removing the stretcher from the frame assembly. The horizontal beam sections and/or the vertical columnar member may be pivotally mounted to be deflected from the horizontal and vertical positions thereof, respectively. Because the assembly may be tilted to allow the removal of the stretcher from the vehicle, the attendants or stretcher bearers need not enter the vehicle to load or unload patients.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIGS. 8a, 8b and 8c, FIGS. 10a, 10b and 10c show a front elevational view, a top plan view and a side elevational view, respectively, of a still further embodiment of an apparatus made in accordance with this invention.

DESCRIPTION OF SPECIFIC EMBODIMENTS

Figure 1:
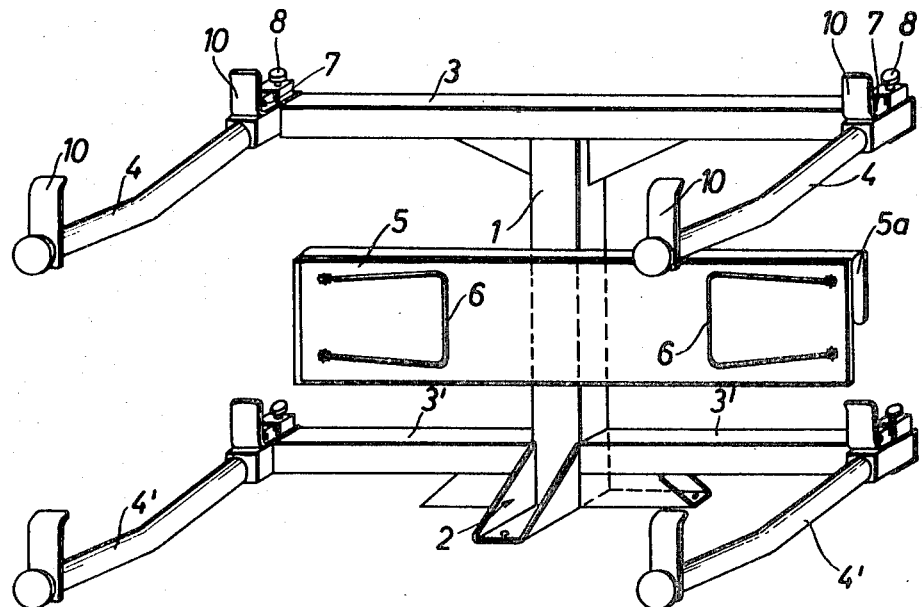
FIG. 1 is a perspective view of an assembly made in accordance with this invention.
Figure 2:
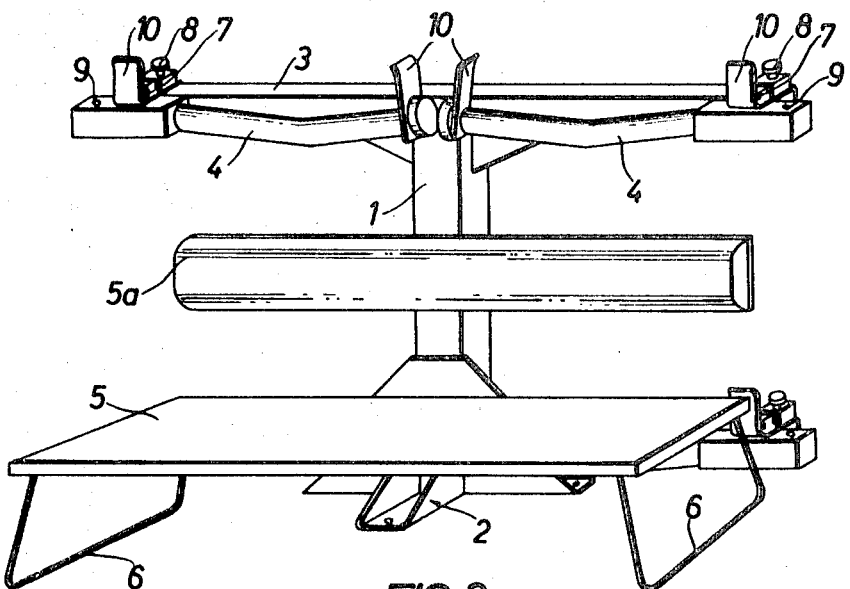
FIG. 2 is a perspective view of the apparatus of FIG. 1 shown in another operational position.

More specifically, an assembly made in accordance with this invention is shown in a first embodiment in FIGS. 1 and 2. The assembly includes a vertical columnar member 1 which may be fixedly attached to the floor of a vehicle with the securing mechanism, generally designated 2. An upper horizontal beam 3 is fixedly attached to the top of the vertical member 1. Cantilever arms 4 are connected to each end of the horizontal beam 3. Two beam sections 3' are mounted at one end thereof to the vertical column 1 below the beam 3 as shown in FIG. 1. The cantilever arms 4' are connected to the free ends of the two beam sections 3' and thereby increase the capacity of the frame assembly. The cantilever arms 4 and 4' are laterally disposed with respect to each other and have their free ends in a projecting position to suspend a stretcher above the bottom of the floor on which the assembly is mounted. The stretcher to be accommodated by each pair of cantilever arms 4 and 4' is not shown in any of the figures so that the structure of the frame assembly may be clearly understood. The cantilever arms 4 and 4' are pivotally mounted at the ends of the beam sections 3 and 3', respectively. The pivotal mounting means in this specific embodiment includes a vertical stud member 7 about which the cantilever arms 4 and 4' rotate inwardly onto the beam sections 3 and 3' as shown in FIG. 2. The arms 4 and 4' are secured in the operative projecting position with a pin 8 which cooperates with an appropriate bore 9 located in the structure of each of the cantilever arms 4 and 4'. An abutment member 10 is mounted on the free ends of each of the cantilever arms 4 and 4' to contain the stretcher placed thereon. The abutment members 10 include a surface having good adhesion properties to insure a solid, positive contact with the stretcher. The good adhesion properties of the surface on the abutment members 10 may be provided by rubber covers or the like being placed thereon.

A foldable seat assembly which includes a seat member 5 and a back rest 5a is mounted on the vertical column 1. The seat member 5 may be swung downwardly into a horizontal position and supported on the floor of the vehicle with the pivotable bowed members 6. The seat member 5 may be mounted on the column 1 with the bracket member 5' as shown in FIG. 4b. The back rest 5a may be attached to the column 1 in any manner suitable to accomplish the desired results.

Figure 3:
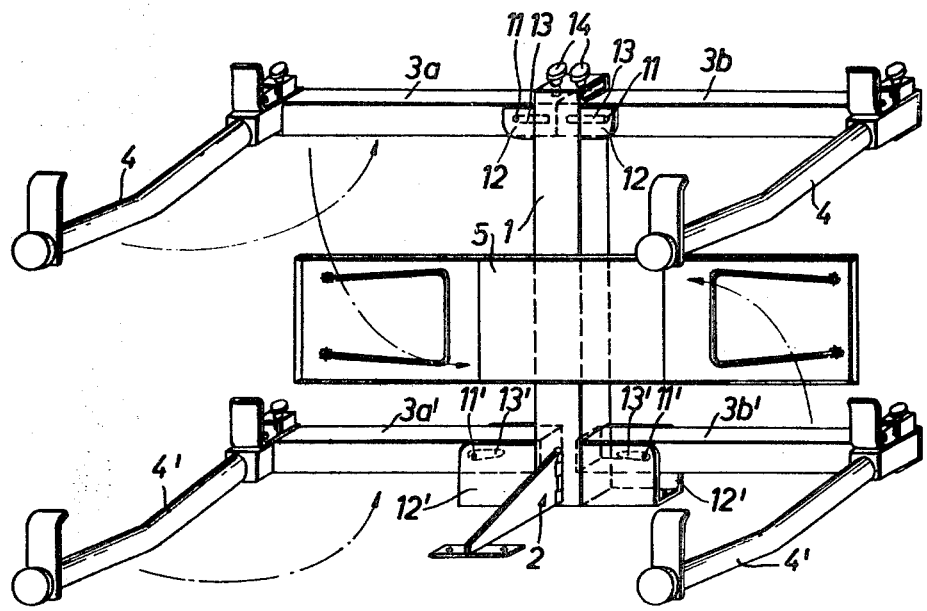
FIG. 3 is a perspective view of another embodiment of an apparatus made in accordance with this invention.
Figure 4A:
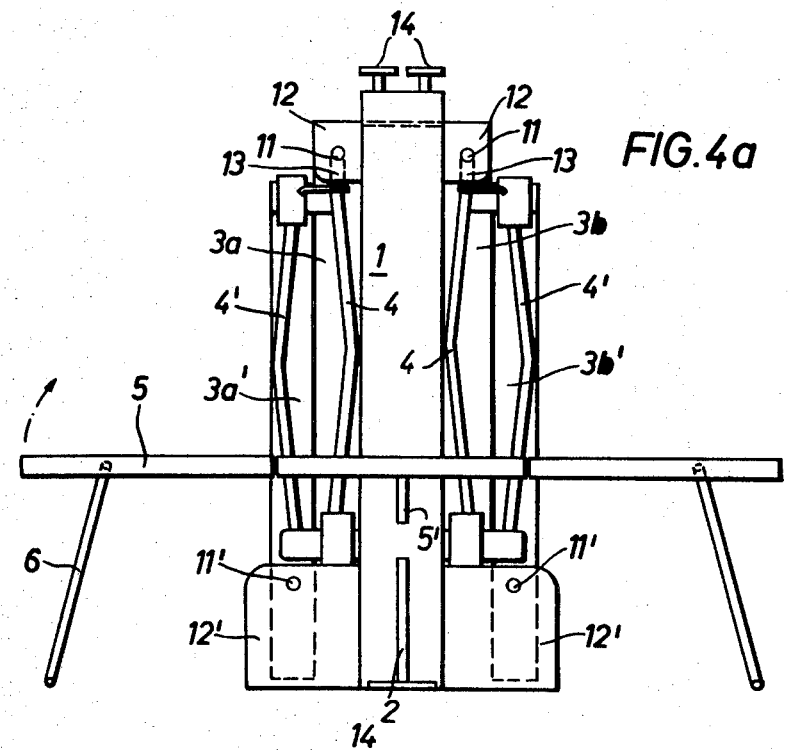
FIG. 4a is a front elevational view of the apparatus of FIG. 3 shown in a folded, stored position.
Figure 4B:
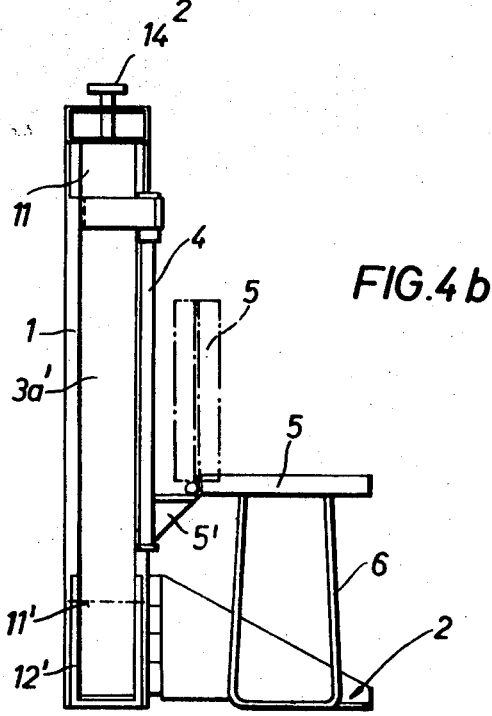
FIG. 4b is a side elevational view of the apparatus shown in FIG. 4a, FIG. 5 is a partial sectional view of another embodiment of an apparatus made in accordance with this invention.

Another embodiment of an assembly made in accordance with this invention is shown in FIGS. 3, 4a and 4b. The upper horizontal support means includes two beam sections 3a and 3b and the lower horizontal support means includes beam sections 3a' and 3b'. The beam sections 3a, 3b and 3a', 3b' pivot about the pivot pins 11 and 11', respectively. The beam sections 3a and 3b fold downwardly as shown by the arrow in FIG. 3 and the beam sections 3a' and 3b' fold upwardly as shown. The pivot pins 11 and 11' are fixedly mounted on lugs 12 and 12', respectively. The pivot pins 11 and 11' are inserted in longitudinal slots 13 and 13', respectively. The slots 13 and 13' are located in the beam sections 3a, 3b and 3a', 3b', respectively. Each one of the beam sections 3a, 3b, 3a' and 3b' is axially displaceable due to the pivot pin and slot arrangement. The beam sections 3a, 3b, 3a' and 3b' are pulled out to release the respective sections from the locked horizontal position as shown in FIG. 3 to be swung to a storage position as shown in FIGS. 4a and 4b. The respective beam sections 3a, 3b, 3a' and 3b' may be locked in the horizontal position as shown in FIG. 3 simply by displacing the respective sections inwardly along the longitudinal axis. They may subsequently be secured in place by either the locking abutments 14 or through contact with hole structures located at the bottom of the columnar member 1. It is noted that the pivot pins 11' are offset with respect to the position of the pivot pins 11 in the direction of the cantilever arms 4' and 4, respectively. This offset relationship allows the overlapping folding of the beam sections 3a, 3b and 3a', 3b'.

The embodiment as shown in FIGS. 4a and 4b illustrate the positioning of the seat member 5 after the cantilever arms 4 and 4' and the horizontal support means have been folded into a stored position.

Figure 5:
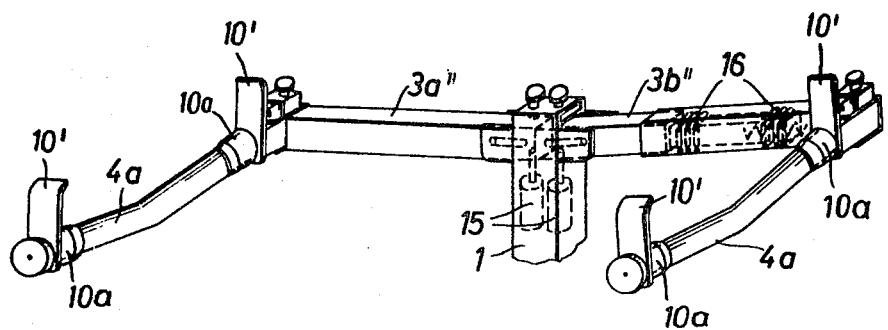

A further embodiment of horizontal support means extending in substantially opposite directions from the column 1 is shown in FIG. 5. The beam sections 3a'' and 3b'' are pivotally mounted on the support column 1. This embodiment includes a means providing resilient support in each of the beam sections 3a'' and 3b''. Hydraulic shock absorbers 15 mounted within the support columnar member 1 are connected to the beam parts 3a'' and 3b''. The hydraulic shock absorbers 15 reduce any shocks acting on the stretcher as a result of the single support column 1 being mounted on the floor of the vehicle and thereby mitigate any shock that may be transmitted to the stretcher.

Additional shock absorbing qualities are effected by the telescoping portions of the beam section 3b''. Bearing members such as needle bearings 16 are placed between the telescopically movable portions of the beam section 3b''. These needle bearings facilitate movement of the telescopic portions with respect to each other whenever an inertial force occurs. The abutment members 10' are pivotally mounted at 10a to rotate about the axis of the cantilever arms 4a. The pivotal movement of the abutments 10' allows the stretcher placed on the cantilever arms 4a to move when the telescopic beam section 3b'' extends or retracts. This structure mitigates any shock that may be transmitted due to starting and stopping of the vehicle.

Figure 6:
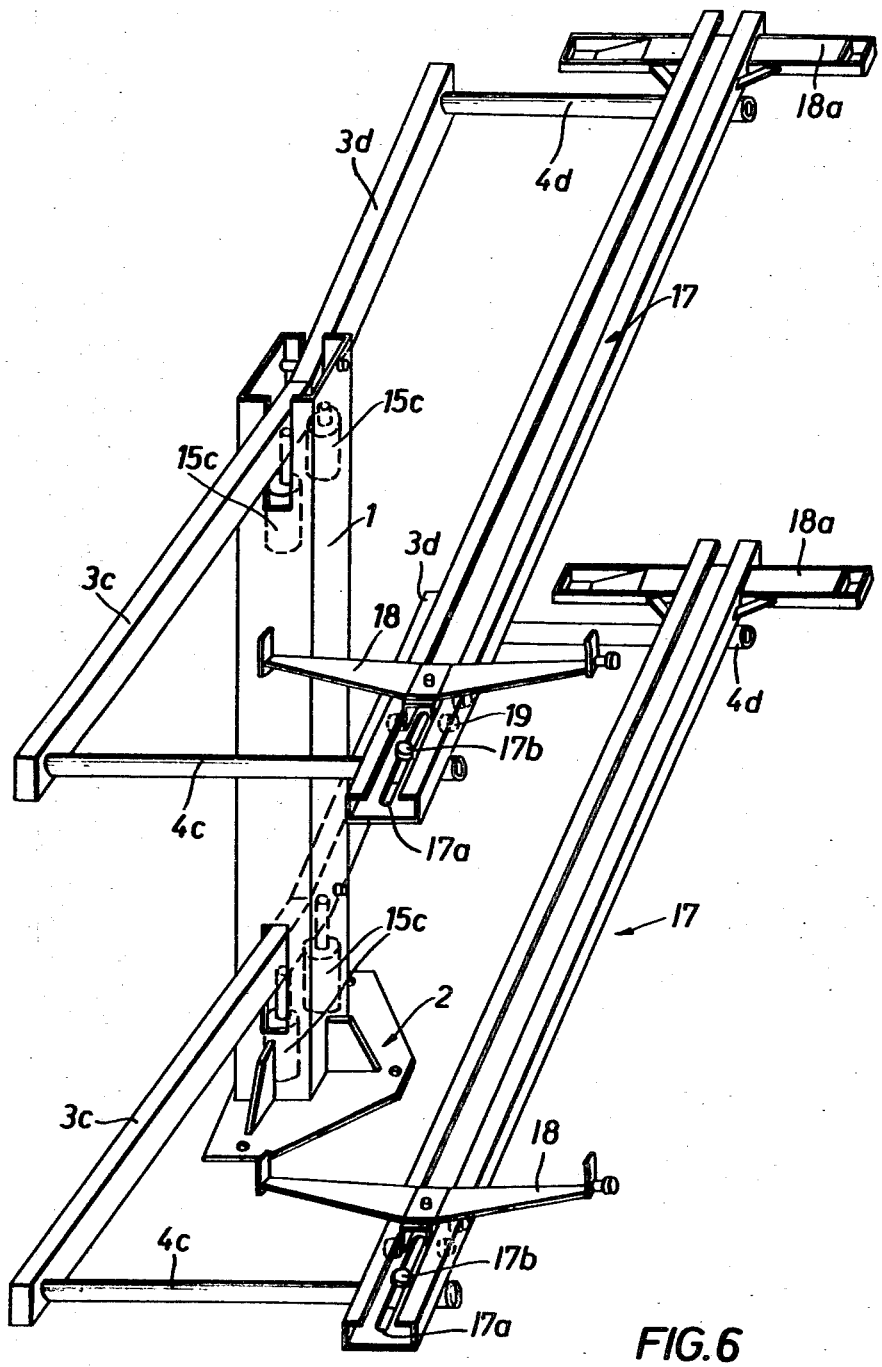
FIG. 6 is a perspective view of another embodiment of an apparatus made in accordance with this invention.

A further embodiment of an apparatus made in accordance with this invention is shown in FIG. 6. Two pairs of beam sections 3c and 3d are pivotally mounted on the columnar member 1. Each pair of cantilever arms 4c and 4d which are fixedly attached to beam sections 3c and 3d, respectively, carry a guide rail member 17. The rail member 17 is adjustably attached to the cantilever arm 4c so that it may be displaced transversely with regard to the cantilever arms 4c and 4d. As shown, the rail member 17 includes a slot member 17a which slidably engages a stop member 17b. Two stretcher bearer members 18 and 18a are mounted on the guide rail member 17. The bearer member 18 includes rollers 19 which allow movement within the channels of the guide rail member 17. In this manner, the bearer member 18 moves the entire length of the rail member 17.

Each pair of the beam sections 3c and 3d is resiliently supported by hydraulic shock absorbers 15c which are located within the column 1. As in the other embodiments of this invention, these shock absorbers 15c greatly reduce any effect of oscillatory movements caused when the apparatus is mounted within an ambulance vehicle. The securing means 2 rigidly connects the columnar member 1 to the floor of the vehicle in this embodiment. Other means of rigidly mounting the column 1 in the vehicle enclosure are contemplated in this invention.

Figure 7:
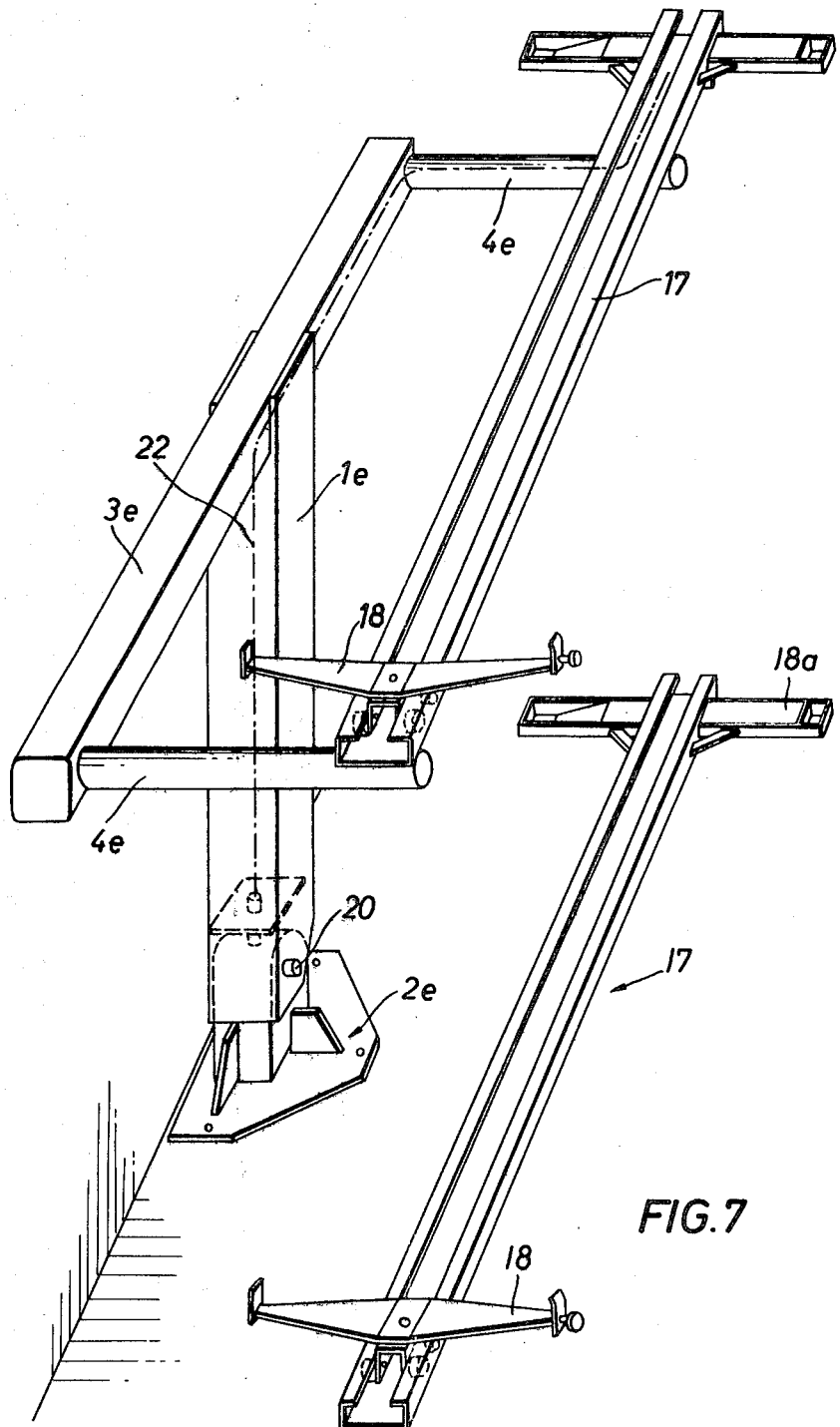
FIG. 7 is a perspective view of a further embodiment incorporating some of the features of the embodiment shown in FIG. 6, FIGS. 8a, 8b and 8c show a front elevational view, a top plan view, and a side elevational view, respectively, of a still further embodiment of an apparatus made in accordance with this invention.
Figure 9:
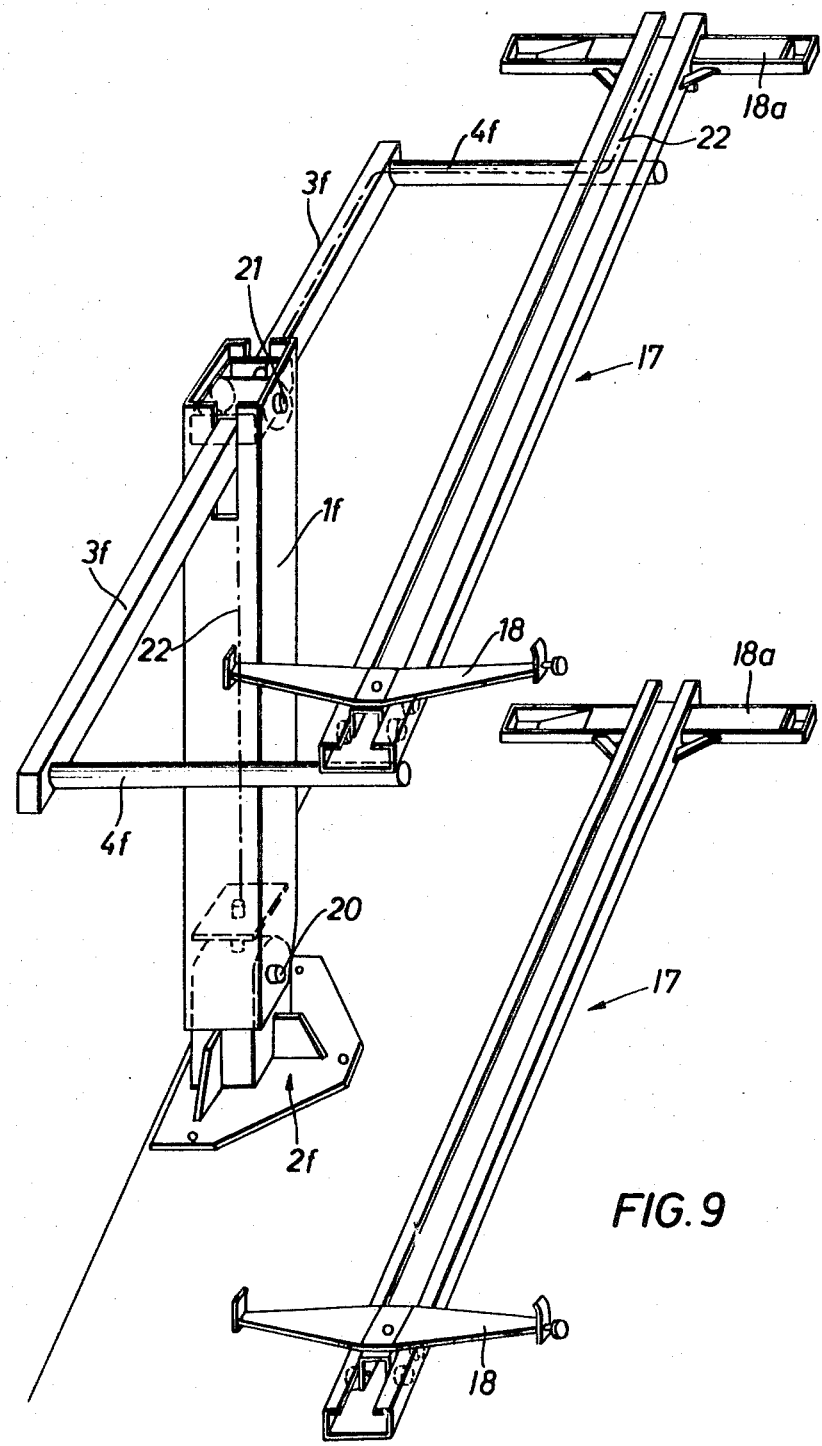
FIG. 9 is a perspective view of the apparatus shown in the various

The single beam section 3e in the embodiment shown in FIG. 7 is fixedly attached to the columnar member 1e. The cantilever arms 4e are fixedly attached to the single beam section 3e. A guide rail member 17 is disposed across the cantilever arms 4e and includes bearer members 18 and 18a which function as discussed hereinabove. The columnar member 1e is pivotally mounted on the horizontal pivot 20 which is a part of the mounting means 2e. A second guide rail member 17 is located on the floor of the vehicle below the suspended guide rail member 17 which is disposed on the arms 4e. A stretcher located on the upper guide rail 17 may be easily removed from the apparatus as shown in FIG. 7 by deflecting the columnar member 1e about the pivot pin 20. The stretcher will slide on the inclined plane formed by the guide rail 17. The movement of the stretcher along the guide rail is facilitated by the structure of the bearer member 18 which slidably moves within the channels of the guide rail 17. The downward inclination of the guide rail 17 upon tilting the columnar member 1e enables the stretcher to be taken out of the interior of the ambulance vehicle under very favorable conditions. The apparatus of this embodiment includes a rope mechanism 22 which is used to initiate the tilting of the columnar member 1e.

Another embodiment of this invention is shown in FIGS. 8a, 8b, 8c, 9, 10a, 10b, and 10c. In this specific embodiment, the beam sections 3f are mounted on the columnar member 1f about the pivot pin 21. The apparatus of this embodiment operates in the same manner as the embodiment of FIG. 7 except that the beam sections 3f may be either tilted as shown in FIG. 8a or maintained in a horizontal position when the columnar member 1f is tilted as shown in FIG. 10a. The FIGS. 8a and 10a show how the bearer member 18 is displaced from one end of the guide member 17 to the other upon removing the stretcher from the apparatus made in accordance with this invention.

Figure 11A:
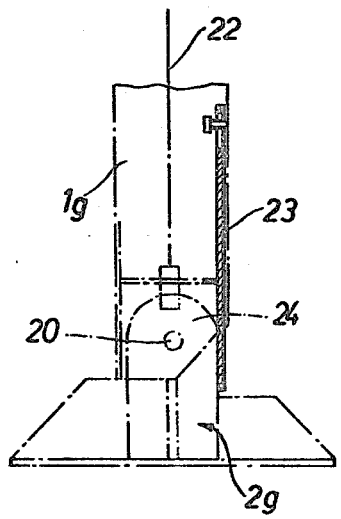
FIG. 11a is a partial view of an apparatus made in accordance with this invention showing a single spring member acting on the vertical columnar member.
Figure 11B:
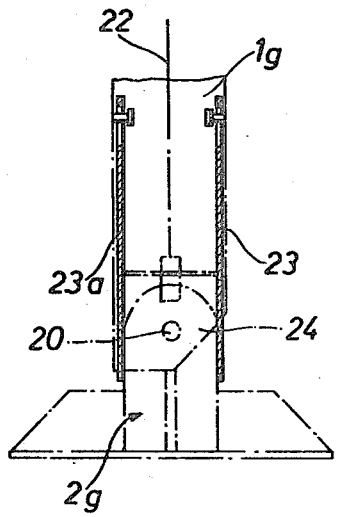
FIG. 11b is a partial sectional view of an apparatus made in accordance with this invention showing two spring members acting on the vertical columnar member.

Further features of this invention are directed to the function of returning the vertical column 1 to its vertical position after it has been deflected therefrom. The accomplishment of this function is shown in the embodiments of FIGS. 11a and 11b. A single leaf spring 23 is fixedly mounted at one end to the inside of the columnar member 1g. The other end of the leaf spring 23 engages the abutment foot 24 which is mounted on the securing mechanism 2g. When the columnar member 1g is deflected away from the vertical position as shown, the leaf spring 32 is resiliently bent between the two ends thereof. As the force applied to the columnar member 1g is reduced or released, the spring member 23 tends to return to its original shape and thereby provides a restoring force which returns the column 1g to the vertical position. The embodiment of FIG. 11b shows a second leaf spring 23a which provides additional spring force to restore the column 1g to a vertical position once it has been deflected away from its original position.

While the apparatus for accommodating a stretcher has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. An apparatus for supporting at least one stretcher in a substantially horizontal position within a vehicle enclosure comprising:
   (a) a single columnar member,
   (b) means for mounting said single columnar member in a substantially vertical position,
   (c) horizontal support means comprising at least two beam sections extending outwardly in substantially opposite directions from said columnar member,
   (d) means mounting said beam sections comprising pivot means permitting deflection of said beam sections with respect to said columnar member, said pivot means including lugs secured to said columnar member, a longitudinal slot in each of said beam sections, and a pivot pin mounted on said lugs for intersection in said slot to effect movement between a locked and unlocked position,
   (e) a cantilever arm connected to each said beam section to suspend said stretcher, said cantilever arms being laterally displaced with respect to each other and having free ends in a projecting position to suspend said stretcher above the bottom of said enclosure, and
   (f) pivot means permitting deflection of said cantilever arms with respect to said beam sections.

2. An apparatus as defined in claim 1 wherein:
said resilient support means includes hydraulic shock absorbers located within said columnar member.

3. An apparatus as defined in claim 1 wherein:
at least one of said beam sections has a telescoping portion and
said resilient support means includes bearing members located within said telescoping portion to provide movement thereto.

4. An apparatus as defined in claim 10 wherein said means for pivoting said columnar member includes a rope mechanism to initiate pivoting movement of said columnar member and said beam section.

5. An apparatus as defined in claim 4 wherein:
said biasing means includes at least one leaf spring mounted on said columnar member.

6. An apparatus as defined in claim 1 wherein:
said apparatus includes means mounting an assembly on said columnar member to provide a seat for a person.

7. An apparatus as defined in claim 6 wherein:
one of said bearer members includes means to effect movement of said bearer member longitudinally along said guide rail member.

8. An apparatus as defined in claim 7 wherein:
said guide rail member is adjustably mounted on said cantilever arms to effect transverse displacement of said guide rail member.

9. An apparatus for supporting at least one stretcher in a substantially horizontal position within a vehicle enclosure comprising:
(a) a single columnar member,
(b) means for mounting said single columnar member in a substantially vertical position,
(c) horizontal support means comprising at least two beam sections extending outwardly in substantially opposite directions from said columnar member,
(d) means mounting said beam sections comprising pivot means permitting deflection of said beam sections with respect to said columnar member and means providing resilient support in each said beam section,
(e) a cantilever arm connected to each said beam section to suspend said stretcher, said cantilever arms being laterally displaced with respect to each other and having free ends in a projecting position to suspend said stretcher above the bottom of said enclosure, and
(f) pivot means permitting deflection of said cantilever arms with respect to said beam sections.

10. An apparatus for supporting at least one stretcher in a substantially horizontal position within a vehicle enclosure comprising:
(a) a single columnar member,
(b) means for mounting said single columnar member in a substantially vertical position and for pivoting said columnar member to deflect it away from said substantially vertical position,
(c) horizontal support means comprising two beam sections extending outwardly in substantially opposite directions from said columnar member,
(d) means mounting said beam sections comprising pivot means to deflect each said beam section with respect to said single columnar member,
(e) a cantilever arm connected to each said beam section to support said stretcher, said cantilever arms being laterally displaced with respect to each other and having free ends in a projecting position to suspend said stretcher above the bottom of said enclosure, and
(f) pivot means permitting inward deflection of said cantilever arms with respect to said beam sections.

11. An apparatus for supporting at least one stretcher in a substantially horizontal position within a vehicle enclosure comprising:
(a) a single columnar member,
(b) means for mounting said columnar member in a substantially vertical position and for pivoting said columnar member to deflect it away from said substantially vertical position,
(c) biasing means to restore said columnar member from a deflected position to said substantially vertical position,
(d) horizontal supporting means comprising at least one beam section on said columnar member,
(e) a cantilever arm connected to each said beam section to support said stretcher, said cantilever arms being laterally displaced with respect to each other and having free ends in a projecting position to suspend said stretcher above the bottom of said enclosure, and
(f) pivot means permitting inward deflection of said cantilever arms with respect to said beam sections.

12. An apparatus for supporting at least one stretcher in a substantially horizontal position within a vehicle enclosure comprising:
(a) a single columnar member,
(b) means for mounting said single columnar member in a substantially vertical position,
(c) horizontal support means comprising at least two beam sections extending outwardly in substantially opposite directions from said columnar member,
(d) means mounting said beam sections comprising means providing resilient support in each said beam section,
(e) at least two cantilever arms and means connecting said cantilever arms on said horizontal support means, said cantilever connecting means including means to lock said cantilever arms in projecting position whereby said cantilever arms are laterally displaced with respect to each other and have free ends in a projecting position to suspend said stretcher above the bottom of said enclosure,
(f) an abutment member located at the free end of each cantilever arm to contain said stretcher thereon, said abutment members being pivotally mounted on said cantilever arms to rotate a limited extent thereon and including a surface having good adhesion properties to contact said stretcher.

13. An apparatus for supporting at least one stretcher in a substantially horizontal position within a vehicle enclosure comprising:
(a) a single columnar member,
(b) means for mounting said single columnar member in a substantially vertical position,
(c) horizontal support means extending in substantially opposite directions from said columnar member,
(d) means fixedly connecting at least two cantilever arms on said horizontal support means, said cantilever arms being laterally displaced with respect to each other and having free ends in a projecting position to suspend said stretcher above the bottom of said enclosure, and
(f) a guide rail member mounted transversely across said cantilever arms and further including bearer members mounted on said guide rail member to receive said stretcher.

References Cited

UNITED STATES PATENTS

| | | | |
|---|---|---|---|
| 2,418,606 | 4/1947 | Smith | 5—86 |
| 2,276,998 | 3/1942 | Stollenwerk | 5—9 |
| 3,172,698 | 3/1965 | Stumpp | 5—9X |

CASMIR A. NUNBERG, Primary Examiner

U.S. Cl. X.R.

5—82, 210